United States Patent
Daanen

(10) Patent No.: US 6,243,597 B1
(45) Date of Patent: Jun. 5, 2001

(54) BATTERY-OPERATED COMMUNICATIONS DEVICE WITH THE CONTINUOUSLY RUNNING REFERENCE CLOCK OF WHICH THE FREQUENCY IS REDUCED WHEN A SYNCHRONIZATION UNIT IS CONTROLLED DURING A STAND-BY MODE

(75) Inventor: Antonius M. J. Daanen, Zürich (CH)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/177,959

(22) Filed: Oct. 23, 1998

(30) Foreign Application Priority Data

Oct. 24, 1997 (EP) .................................. 97203292

(51) Int. Cl.$^7$ .................................................. H04M 1/00
(52) U.S. Cl. ...................... 455/574; 455/343; 455/38.3; 455/256
(58) Field of Search .................... 455/574, 38.3, 455/256, 343, 255

(56) References Cited

U.S. PATENT DOCUMENTS

| | | | |
|---|---|---|---|
| 5,448,755 | * 9/1995 | Tanaka | 455/38.3 |
| 5,758,278 | * 5/1998 | Lansdowne | 455/343 |
| 5,774,701 | * 6/1998 | Matsui et al. | 395/556 |
| 5,794,137 | * 8/1998 | Harte | 455/343 |
| 5,805,989 | * 9/1998 | Ushida | 455/343 |
| 5,805,990 | * 9/1998 | Ohki | 455/343 |
| 5,815,821 | * 9/1998 | Pettersson | 455/575 |
| 5,949,812 | * 9/1999 | Turney et al. | 375/200 |
| 5,953,646 | * 9/1999 | Hirasawa | 455/343 |

FOREIGN PATENT DOCUMENTS

| | | | |
|---|---|---|---|
| 2297854A | 8/1996 | (GB) | G04G/7/02 |
| 2297883A | 8/1996 | (GB) | H04Q/7/32 |

OTHER PUBLICATIONS

By C. Papachristou et al. "A Multiple Clocking Scheme for Low Power RTL Design", pp. 27–32, Proceedings of the 1995 Int. By Symposium on Low Power Design, Dana Point, pp. 23–26, Apr. 1995.

By H.W. Tuttlebee, "Cordless Telecommunications in Wurope", Springer Verlag, 1990 Appendix 3, pp. 273–278.

* cited by examiner

Primary Examiner—Edward F. Urban
Assistant Examiner—Blane J. Jackson

(57) ABSTRACT

A battery-operated communications device has a radio frequency part, a baseband processing arrangement, a timing control arrangement, a continuously running reference clock that is coupled to the timing control arrangement, and a clock frequency reduction means. The timing control arrangement is partitioned into a logic block that has synchronization means, for, during a reduced power stand-by mode of the communications device, maintaining synchronization with respect to a radio base station. The clock frequency reduction means generates a derived clock signal that has a frequency lower than a clock frequency of the reference clock oscillator. The derived clock signal controls the logic block during the reduced power stand-by mode.

11 Claims, 3 Drawing Sheets

BATTERY-OPERATED COMMUNICATIONS DEVICE WITH THE CONTINUOUSLY RUNNING REFERENCE CLOCK OF WHICH THE FREQUENCY IS REDUCED WHEN A SYNCHRONIZATION UNIT IS CONTROLLED DURING A STAND-BY MODE

BACKGROUND OF THE INVENTION

1. Field of the Invention

The present invention relates to a battery-operated communications device comprising a radio frequency part, a baseband processing arrangement, and a timing control arrangement.

2. Description of the Related Art

A battery-operated communications device of the above kind is known from the article "A Multiple Clocking Scheme for Low Power RTL Design", C. Papachristou et al., pp. 27–32, Proceedings of the 1995 Int. Symposium on Low Power Design, Dana Point, 23–26 April 1995. In said article it is described how CMOS core circuitry of a battery-operated device, such as a cellular phone, is re-designed to achieve power reduction in an active mode. In such devices power reduction is important so as to increase stand-by and talk times. For ecological reasons, use of batteries should be minimised. For ergonomical reasons, the weight and size of the communications device should be as low as possible. A non-overlapping multiple clocking scheme is described for clocking non-disjunct partitions. The working frequency of each partition module is f/n, f denoting frequency and n being an integer. Such an approach requires a careful selection of partitions in the design phase. Besides, the clock structure is complicated. For disjunct clock circuitry an increased chip area is needed so that costs of IC (Integrated Circuit) manufacturing are increased.

SUMMARY OF THE INVENTION

It is an object of the present invention to provide a battery-operated communications device in which power reduction is achieved in a simple way, virtually without an increase of chip-area.

To this end the battery-operated communications device of the above kind is characterised in that the communications device comprises a continuously running reference clock oscillator which is coupled to the timing control arrangement, the communications device being arranged to operate in an active mode and a reduced power stand-by mode, the timing control arrangement being partitioned into a first logic block comprising synchronisation means for maintaining synchronisation during the reduced power stand-by mode, and comprising a clock frequency reduction means for generating a derived clock signal having a frequency lower than the clock frequency of the reference clock oscillator, which derived clock signal controls the first logic block during the reduced power stand-by mode. Herewith, only the clock control logic circuitry has to be re-designed, hardly requiring an increase of chip area as compared to a communications device without reduced power during stand-by mode. Because the reference clock oscillator is running at its nominal frequency both during the active mode and the stand-by mode, long start-up times are avoided. Herewith, management of mode switching and delay times is made simpler. The core design of the communications device is hardly modified. Because there is no real clock gating, no practical problems as regards clock skew occur.

The invention is based upon the insight that during stand-by mode power consumption can be reduced for circuitry which has to remain active during stand-by mode but with a reduced functionality so that operating speed can be reduced, while the reference clock oscillator runs with the same speed as during the active mode.

Embodiments are claimed in the dependent claims. Although a divider can be used as simple circuitry for reducing the clock frequency, other means such as a clock pulse delete arrangement can be used. If the logic to be controlled is edge sensitive logic, the duty cycle of the clock is not critical. If the logic is level sensitive, preferably the duty cycle of the clock signal is around 50%. In a simple embodiment, the first logic block can both generate a clock selection signal to control a multiplexer multiplexing the clock signal of the reference clock oscillator and the reduced clock signal and a clock buffer of circuitry such as a second logic block which can be switched off completely during the stand-by mode. Because of the simple structure of power reduction during the stand-by mode, independently other power consumption saving means can be applied such as reducing the power supply voltage, logic circuit minimalisation, optimum wiring layout, break-before-make clock buffer circuitry and so on.

BRIEF DESCRIPTION OF THE DRAWING

The present invention will now be described, by way of example, with reference to the accompanying drawings, wherein FIG. 1 schematically shows a digital wireless communication system.

Throughout the figures the same reference numerals are used for the same features.

DETAILED DESCRIPTION OF THE INVENTION

Figure 1:
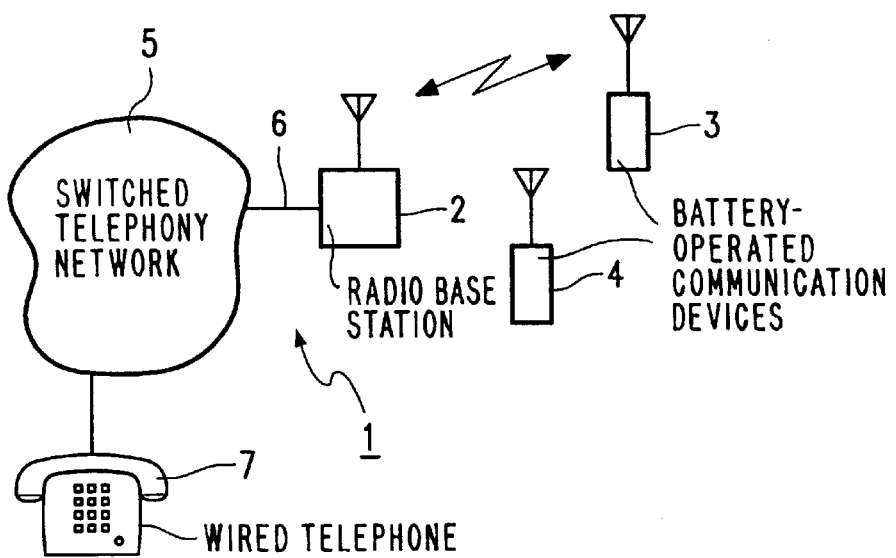

FIG. 1 schematically shows a digital wireless communication system 1. By way of example a DECT (Digital Enhanced Cordless Telecommunications) system will be described, but the system can be any wireless communications system. For a more detailed description of DECT referred is to the handbook "Cordless Telecommunications in Europe", H.W. Tuttlebee, Springer Verlag, 1990, Appendix 3, pp. 273–278. When locked to a radio base station, handsets should be and remain synchronised to the base station. A DECT system applies so-called dynamic channel allocation by handsets and locking is done on a beacon signal of a radio base station. Such locking and synchronisation is well-known in the art. The system 1 comprises a DECT radio base station 2, and a plurality of battery-operated portable DECT communication devices 3 and 4 for communicating with the radio base station 2. The radio base station 2 is coupled to a switched telephony network 5 via a telephone line 6. The network 5 can be a public or a private network. The network 5 can be an analog or digital telephony network. Furthermore, a wired telephone 7 of a fixed network subscriber is shown which is coupled to the switched network 5.

Figure 2:
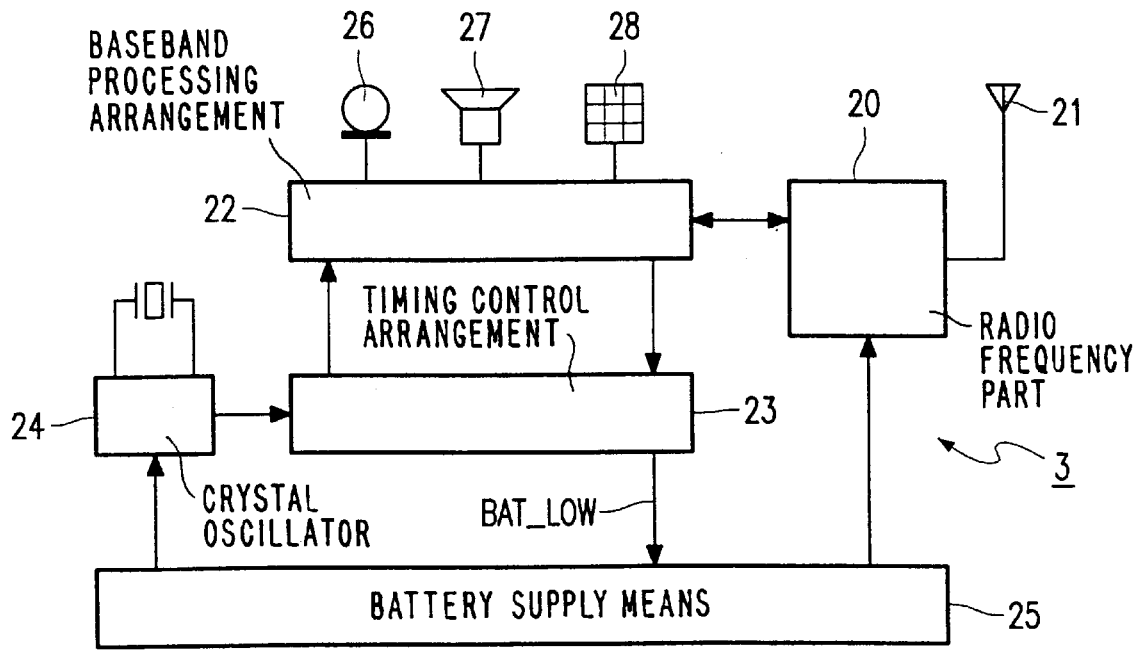
FIG. 2 shows a battery-operated communications device according to the present invention.

FIG. 2 shows a block diagram of the battery-operated communications device 3 according to the present invention.

The communications device 3 comprises a radio frequency part 20 coupled to an antenna 21 and a baseband processing arrangement 22 coupled to a timing control arrangement 23. In operation, the device 3 is a programmed device operating according to the DECT protocol. The device 3 further comprises a crystal oscillator 24 and battery power supply means 25. In a stand-by mode, the battery supply means 25 can be controlled by a signal BAT_LOW generated by the timing control arrangement 23 and controlling the supply voltage to a lower voltage than in an active mode. Such a control is known as such. The communications device 3 further comprises a microphone 26, an earpiece or speaker 27, and a keyboard 28. The timing control arrangement 23 supplies timing control information in accordance with the DECT Standard to the baseband processing arrangement 22 when being in the stand-by mode. If the device 3 is locked to the radio base station 2, the timing control arrangement is synchronised to the radio base station 2. Such a synchronisation is known as such. In accordance with DECT protocols, synchronisation timing information between the radio base station 2 and the battery-operated communications device 3 is exchanged, when being in the active mode, via the air interface and the antenna 21. Assuming CMOS logic, power consumption is proportional to clock switching frequency and to the square of the supply voltage. Considerable power reduction can thus be achieved by reducing the clock frequency and/or the supply voltage during the stand-by mode.

Figure 3:
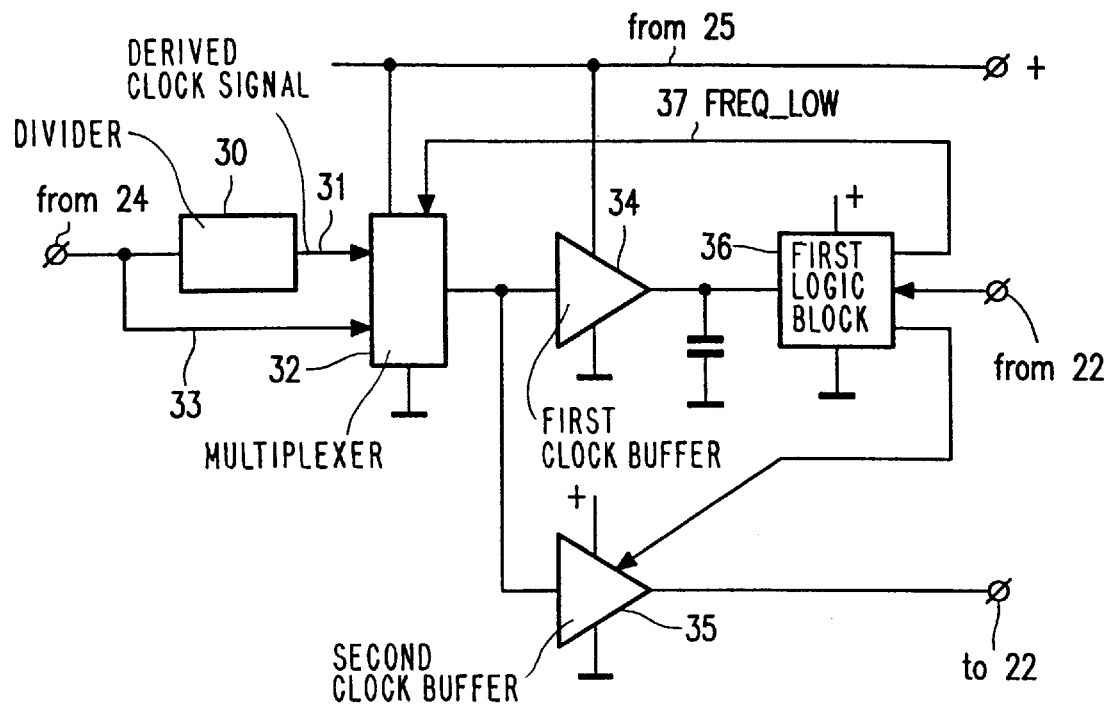
FIG. 3 shows a first embodiment of clock frequency reduction means according to the present invention.

FIG. 3 shows a first embodiment of clock frequency reduction means according to the present invention comprising a divider 30 at input side being coupled to the oscillator 24 and at output side being coupled to a first input 31 of a multiplexer 32. The oscillator 24 is directly coupled to a second input 33 of the multiplexer 32. A first logic block 36 comprising synchronisation means for maintaining synchronisation during the reduced power stand-by mode is coupled to the multiplexer 32 via a first clock buffer 34, the synchronisation means being known as such and not being shown in detail here. At output side, the multiplexer 32 is also coupled to a second logic block 22 via a second clock buffer 35. Because synchronisation may not be lost during the stand-by mode, synchronisation timing information must be preserved when the communications device 3 is in the stand-by mode. For this reason, the oscillator 24 and the timing control arrangement 23 keep running while the device 3 is the stand-by mode. During the stand-by mode, the timing control arrangement 23 regularly activates the other parts of the baseband processing arrangement 22 and the radio frequency part 20 so as to check whether the timing control arrangement 23 is still running synchronous with the radio base station 2 and to maintain synchronous accordingly. After synchronisation, the base band processing arrangement 22 and the radio frequency part 20 are deactivated so that the communications device 3 adopts the stand-by mode again. At this instant, the clock buffer 35 is disabled. It is important that the block 30 is optimised as regards power consumption because this block runs at the high crystal oscillator frequency during the stand-by mode. In a given example of a DECT device 3, both in the active mode and the stand-by mode, the oscillator 24 runs at 13.824 MHz, whereas the derived clock signal has a frequency of 1.152 MHz. Herewith, in the stand-by power mode, power consumption of the logic blocks clocked by the derived clock is reduced by a factor of twelve. In the stand-by power mode, as regards the circuits for preserving synchronisation, which use the same hardware as in the active mode, there is a surplus of computational power. For this reason, the supply voltage can also be reduced during the stand-by mode. In a given DECT example, typically a power consumption reduction factor of five was achieved.

Figure 4:
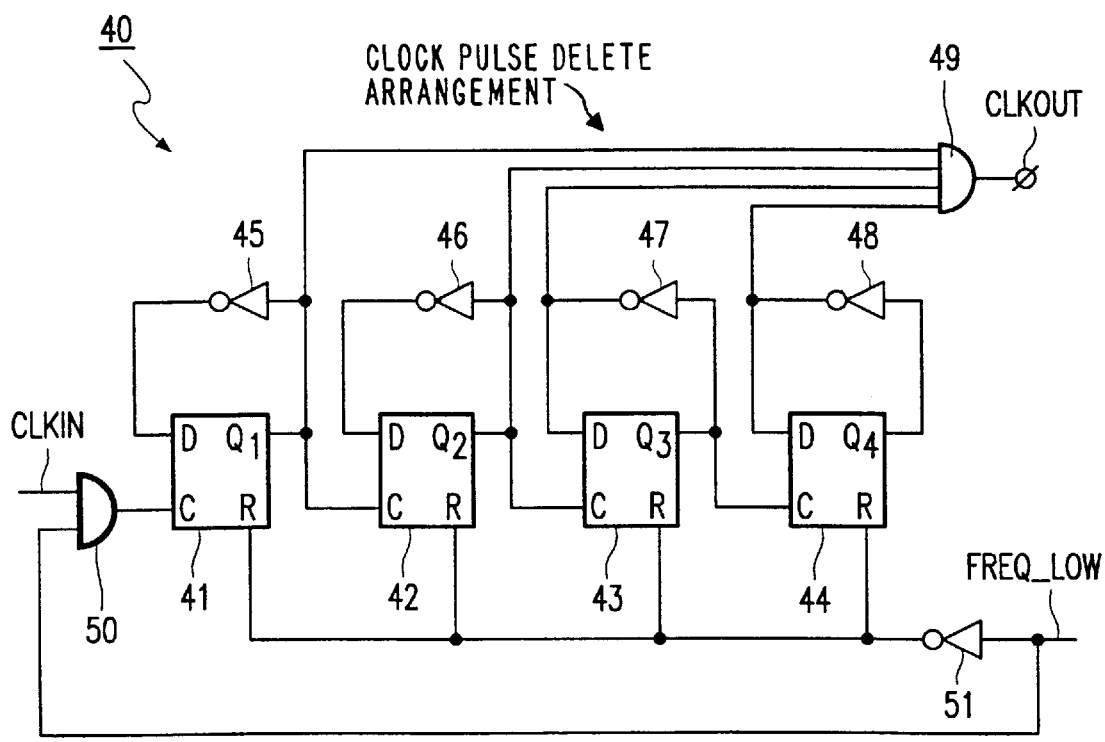
FIG. 4 shows a second embodiment of clock frequency reduction means according to the present invention.

FIG. 4 shows a second embodiment of clock frequency reduction means according to the present invention. In this embodiment the reduction means comprises a clock pulse delete arrangement 40 of which an embodiment will be described in more detail here. In the given embodiment, the derived clock signal has one pulse every twelve pulses of the reference clock. Other clock pulse delete schemes can also be applied. In the event of edge sensitive logic, any clock pulse reduction scheme can be applied. The clock pulse delete arrangement 40 comprises a cascade of four D-flipflops 41, 42, 43 and 44, each flipflop having a data input D, a clock input C, an output Q and a reset input R. The respective outputs Q are coupled to the respective D inputs via respective inverters 45, 46, 47 and 48. A derived clock signal CLKOUT is available an output of an AND-gate 49 of which respective inputs are coupled to the outputs Q of the flipflops 41 and 42, and to the inverted outputs of the flipflops 43 and 44. A clock CLKIN, generated by the reference clock oscillator 24, is coupled to the clock input C of the D-flipflop 41 via an AND-gate 50 of which another input is coupled to all reset inputs R via an inverter 51. A control signal FREQ_LOW activates and deactivates the arrangement 40.

Figure 5:
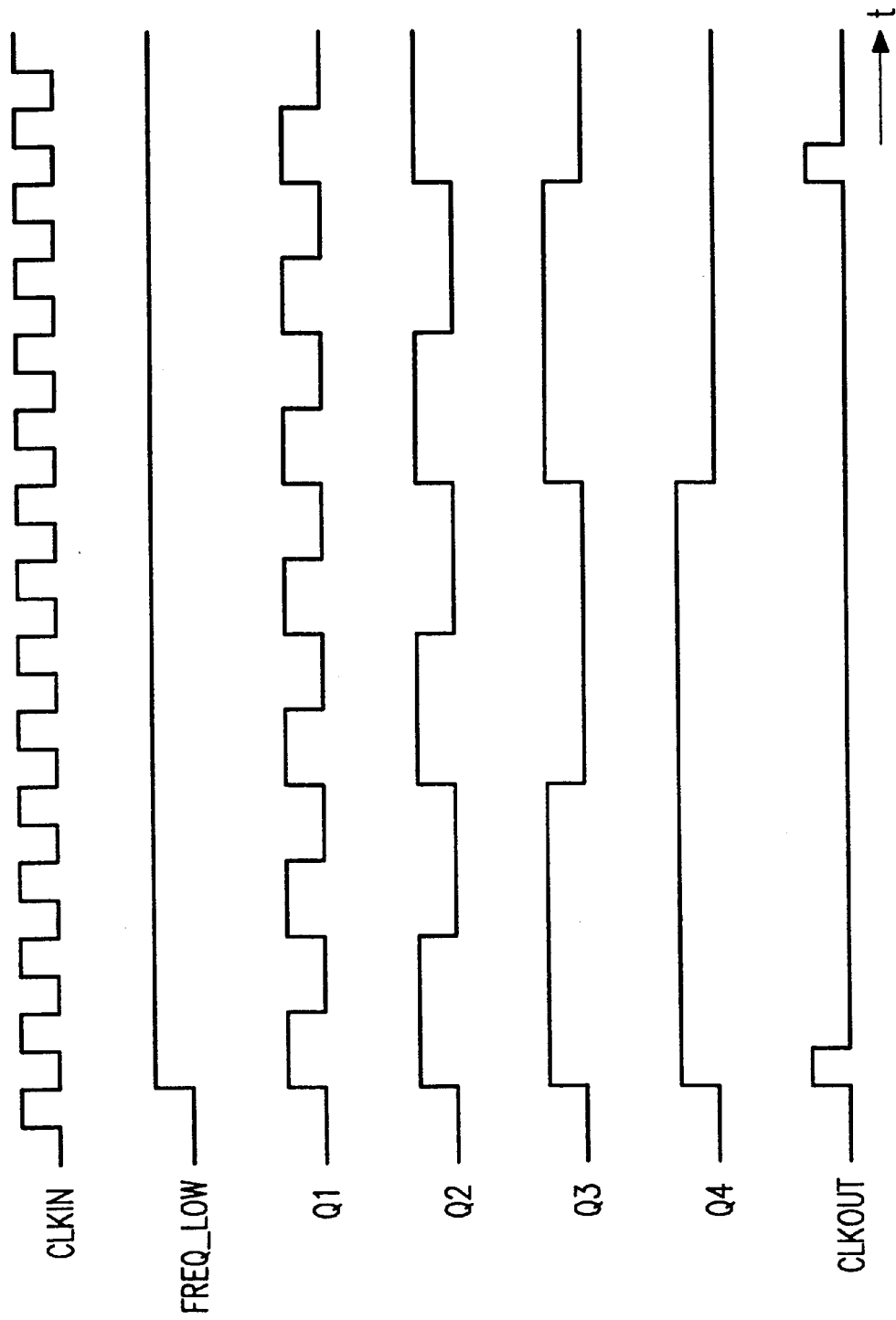
FIG. 5 shows a timing diagram of the second embodiment.

FIG. 5 shows a timing diagram of the second embodiment. Shown are the clock signals CLKIN and CLKOUT, the output signals Q1, Q2, Q3 and Q4 of said D-flipflops, and the control signal FREQ_LOW as a function of time t. As can be simply verified, the derived clock signal CLKOUT has a frequency of one twelfth of the frequency of the reference clock oscillator 24.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A battery-operated communications device operable in an active mode and a reduced power stand-by mode, the communications device comprising:

a radio frequency part;

a timing control arrangement, the timing control arrangement comprising a first logic block that comprises synchronization means for, during the reduced power stand-by mode, maintaining synchronization with respect to a beacon signal transmitted by a radio base station;

a continuously running reference clock oscillator which is coupled to the timing control arrangement oscillator and which runs at the same clock speed during the active mode and the reduced power stand-by mode;

a clock frequency reduction means for generating a derived clock signal having a frequency lower than a clock frequency of the reference clock oscillator, which derived clock signal controls the first logic block during the reduced power stand-by mode; and a baseband processing unit with a second logic block of which a clock input is disabled during the reduced power stand-by mode by a disable signal generated by the first logic block, the disable signal being generated upon exchange of synchronization information between the communication device and the radio base station when the communications device is in the active mode.

2. A communications device as claimed in claim 1, wherein the clock frequency reduction means comprises a divider.

3. A communications device as claimed in claim 2, wherein the clock frequency reduction means comprises a multiplexer having a first input coupled to an output of the divider and having a second input coupled an input of the divider and to the reference clock oscillator, the multiplexer being controlled by a clock selection signal generated by the first logic block.

4. A communications device as claimed in claim 3, wherein the clock frequency reduction means further comprises a first clock buffer that is coupled between an output of the multiplexer and the first logic block.

5. A communications device as claimed in claim 4, further comprising a second clock buffer that is coupled between the output of the multiplexer and the clock input of the second logic block.

6. A communications device as claimed in claim 1, wherein the clock frequency reduction means comprises a clock pulse delete arrangement.

7. A communications device as claimed in claim 6, wherein the clock frequency reduction means comprises a multiplexer having a first input coupled to an output of the clock pulse delete arrangement and having a second input coupled to an input of the clock pulse delete arrangement and to the reference clock oscillator, the multiplexer being controlled by a clock selection signal generated by the first logic block.

8. A communications device as claimed in claim 7, wherein the clock frequency reduction means further comprises a first clock buffer that is coupled between an output of the multiplexer and the first logic block.

9. A communications device as claimed in claim 8, further comprising a second clock buffer that is coupled between the output of the multiplexer and the clock input of the second logic block.

10. A communications device as claimed in claim 6, wherein the clock pulse delete arrangement comprises a series arrangement of D-flips-flops, inverters between respective outputs and data inputs of the D-flips-flops, and an AND-gate of which inputs are respectively coupled to the respective outputs of the D-flip-flops and of which an output provides the derived clock signal.

11. A communications device as claimed in claim 1, wherein the power supply voltage of the communications device is reduced during stand-by mode.

* * * * *